United States Patent
Billod

(10) Patent No.: US 9,281,677 B2
(45) Date of Patent: Mar. 8, 2016

(54) METHOD FOR PROTECTING AN ELECTRICAL ENERGY DISTRIBUTION BOX

(71) Applicant: ECE, Paris (FR)

(72) Inventor: Henri Billod, Othis (FR)

(73) Assignee: ECE, Paris (FR)

( * ) Notice: Subject to any disclaimer, the term of this patent is extended or adjusted under 35 U.S.C. 154(b) by 181 days.

(21) Appl. No.: 13/888,880

(22) Filed: May 7, 2013

(65) Prior Publication Data

US 2013/0314831 A1    Nov. 28, 2013

(30) Foreign Application Priority Data

May 7, 2012    (FR) ...................... 12 54171

(51) Int. Cl.
| | |
|---|---|
| *H02H 3/00* | (2006.01) |
| *H02H 3/08* | (2006.01) |
| *H02H 3/32* | (2006.01) |
| *H02H 7/22* | (2006.01) |
| *H02H 9/02* | (2006.01) |

(52) U.S. Cl.
CPC . *H02H 3/08* (2013.01); *H02H 3/32* (2013.01); *H02H 7/22* (2013.01)

(58) Field of Classification Search
CPC ......... H02H 3/08; H02H 3/093; H02H 3/087; H02H 7/18
USPC ................................................... 361/87, 93.1
See application file for complete search history.

(56) References Cited

U.S. PATENT DOCUMENTS

| | | | |
|---|---|---|---|
| 2003/0223167 A1 | 12/2003 | Udren | |
| 2004/0057175 A1 | 3/2004 | Fedirchuk | |
| 2004/0239181 A1* | 12/2004 | Obayashi et al. | 303/152 |
| 2007/0238362 A1 | 10/2007 | Newman | |
| 2011/0184579 A1* | 7/2011 | Nilsen et al. | 700/295 |

FOREIGN PATENT DOCUMENTS

FR    2262428    9/1975

OTHER PUBLICATIONS

French Search report for French patent application No. FR 1254171 issued Jan. 28, 2013.

* cited by examiner

*Primary Examiner* — Dharti Patel
(74) *Attorney, Agent, or Firm* — Meyertons, Hood, Kivlin, Kowert & Goetzel, P.C.; Eric B. Meyertons

(57) ABSTRACT

A method for protecting an electrical energy distribution box (BODP) equipped with a supply current distribution bar (BDP) intended to be connected between an electrical energy source (G) and loads (Q1, Q2, Q3 . . . Qn) to be supplied, comprising detecting an electrical fault in the distribution box (BODP). The detection step comprises: —measuring a supply current drawn on said supply current distribution bar (BDP) by the electrical energy source (G), —measuring load currents distributed from the distribution bar to each of the loads (Q1, Q2, Q3 . . . Qn), and continuous processing of said measurements of current in the course of which the supply current and the load currents are compared with load current threshold values so as to detect overloads.

13 Claims, 3 Drawing Sheets

METHOD FOR PROTECTING AN ELECTRICAL ENERGY DISTRIBUTION BOX

BACKGROUND OF THE INVENTION

1. Field of the Invention

The invention relates to the detection and the protection of an electrical fault and more particularly of an electrical fault in an electrical distribution box. The invention applies advantageously but in a non-limiting manner to electrical distribution in an aircraft.

2. Description of the Relevant Art

The distribution of electrical energy in an aircraft is very hierarchical. Power is firstly produced by means of generators driven by the engines of the aircraft. Then, this energy is conveyed to primary distribution boxes. The electrical energy is then distributed by cables exiting the primary distribution boxes either directly to loads, or to secondary distribution boxes which themselves supply the remainder of the electrical loads.

This operating principle could be modified when one of the generators dedicated to a primary distribution box is inoperative. In this case, another generator of the airplane will be able to replace the generator which is inoperative.

A first type of protection, called overload protection is known from the prior art. This first type of protection comprises a command means for the generator, a line contactor placed on the cables which exit the primary and secondary distribution boxes and a control means for the line contactors. These protection elements allow shutdown of the generator and opening of the line contactors in case of a current overload or a fault. This first type of protection can also comprise at the output of the distribution boxes, instead of or as a supplement to the line contactor, a circuit breaker, a fuse or a circuit breaker contactor. These protection elements also allow opening in case of a current overload or of a fault on the cable that they are protecting.

To allow selectivity, that is to say shutdown of electricity distribution at a necessary and sufficient rank of the distribution, the protection elements mentioned hereinabove have current-detection thresholds and tripping times which differ. Their tripping time depends especially on their rank in the distribution. For example, the tripping time of a fuse of a cable at the output of a secondary distribution box will be less than the tripping time of the generator command means. This makes it possible for just the protection element located directly upstream of the electrical fault to trip, the protection elements further upstream not tripping. That said, for example in the case of the generator command means, its tripping time may be as long as 5 seconds. Thus, if a fault appears in the primary distribution box, it will be necessary to wait nearly 5 seconds before shutdown of the generator. This time is long enough to cause damage.

A second type of protection, called differential protection, which comprises a measurement of the current upstream and downstream of a distribution line, is also known from the prior art. In the case of absence of fault, the two measurements of current are equal. In the case of a fault, the current is different and this fault will be easy to locate since it is located between the two measurement points. This protection is for example used to protect the cables of the generator. On the other hand, this protection cannot easily be used to detect an internal short-circuit of a distribution box since a measurement is then necessary on each of the distribution lines exiting from the distribution box. Considering the number of lines to be measured and the disparity of the sensors used, there exist high risks of untimely tripping of the protection.

SUMMARY OF THE INVENTION

There is proposed according to the invention a protection method and a device which is aimed at overcoming the drawbacks of the protections mentioned hereinabove.

According to one aspect, there is proposed a method for protecting an electrical energy distribution box equipped with a supply current distribution bar intended to be connected between an electrical energy source and loads to be supplied, comprising a step of detecting an electrical fault in the distribution box.

This detection step comprises:
 a first step of measuring a supply current drawn on said supply current distribution bar by the electrical energy source,
 a second step of measuring load currents distributed from the distribution bar to each of the loads, and
 a step of continuous processing of said measurements of current in the course of which the supply current and the load currents are compared with load current threshold values so as to detect overloads.

One no longer compares measurements of current but the presence of an overload upstream and downstream of the distribution box, in particular of the primary distribution box. Thus, it is possible to detect a fault in the box while limiting the risk of untimely tripping of the protection.

It will be noted that the supply current drawn on the distribution bar can be a current originating from a generator dedicated to the primary distribution box. It can also be, in the case where the generator of the primary distribution box is no longer operative, a current originating from another generator dedicated in principle to another primary distribution box. In this case, the supply current drawn on the distribution bar arises from the distribution bar of this other primary distribution box.

According to one mode of implementation, the processing step comprises:
 a first step of comparing the supply current with a supply current threshold value;
 if the supply current is greater than the supply current threshold value, a second step of comparing the loads of the load current with load current threshold values; an electrical fault being detected in the distribution box if on completion of the second comparison step none of the load currents is greater than the load current threshold values.

Thus, to detect the fault in a primary distribution box a test is carried out to check whether the overload of the energy source propagates in the distribution lines. It is thus possible to detect an electrical fault and its location.

According to another mode of implementation, dedicated to the protection of a primary distribution box comprising a first switching component, for example a line contactor located between the electrical energy source and the distribution bar, and second switching components, for example line contactors located between the distribution bar and each of the loads, this method comprises a step of opening at least one of the switching components if a fault is detected in the distribution box.

Thus, the tripping of the contactors allowing the isolation of the distribution box is performed rapidly on completion of the detection of the fault.

The electrical energy source can be a generator dedicated to a first primary distribution box. This energy source can then also act as energy source for another primary distribution box, for example in the case where the generator of this other primary distribution box is no longer operative. In this case, the second contactor can be a BTC contactor located between the distribution bar of the first primary distribution box and the distribution bar of this other primary distribution box, switching a load current.

The electrical energy source can be another generator dedicated to another primary distribution box, for example in the case where the generator dedicated to the first primary distribution box is no longer operative. In this case, the first contactor can be a BTC contactor located between the distribution bar of the first primary distribution box and the distribution bar of this other primary distribution box, switching a supply current.

According to another mode of implementation, in the course of the opening step the first switching component and/or the second switching components are opened.

According to another mode of implementation, the opening step furthermore comprises a step of shutting down the electrical energy source.

According to another aspect, there is proposed a system for protecting an electrical energy distribution box equipped with a supply current distribution bar intended to be connected between an electrical energy source for example a generator dedicated to said distribution box and loads to be supplied.

This system comprises means for detecting an electrical fault in the distribution box, comprising:
  a first measurement means for measuring a supply current drawn on said supply current distribution bar by the electrical energy source;
  second measurement means for measuring load currents distributed from the distribution bar to each of the loads; and
  means for processing said measurements of current, said processing means comprising means for comparing the supply current and load currents with threshold values so as to detect overloads.

According to one embodiment, the processing means comprise:
  first comparison means configured to compare the supply current with a threshold value of a supply current,
  second comparison means configured to compare the load currents with load current threshold values if the supply current is greater than the threshold value of the supply current,
  the processing means being configured to detect an electrical fault in the distribution box if none of the load currents is greater than the load current threshold values.

For example, the threshold value of a supply current corresponds to an acceptable maximum supply current. Likewise, the load current threshold value can correspond to an acceptable maximum load current.

According to another embodiment, the system comprises a first switching component located between the energy source and the distribution bar, second switching components located between the distribution bar and each of the loads and control means adapted for opening at least one of said switching components if an electrical fault is detected in the distribution box.

The switching components are for example line contactors.

According to another embodiment, the control means are adapted for opening the first switching component if an electrical fault is detected in the distribution box.

According to another embodiment, the electrical energy source is commanded by a command means adapted for commanding shutdown of the electrical energy source if an electrical fault is detected in the distribution box.

BRIEF DESCRIPTION OF THE DRAWINGS

Other advantages and characteristics of the invention will be apparent on examining the detailed description of a wholly non-limiting embodiment, and the appended drawings in which.

Figure 1:
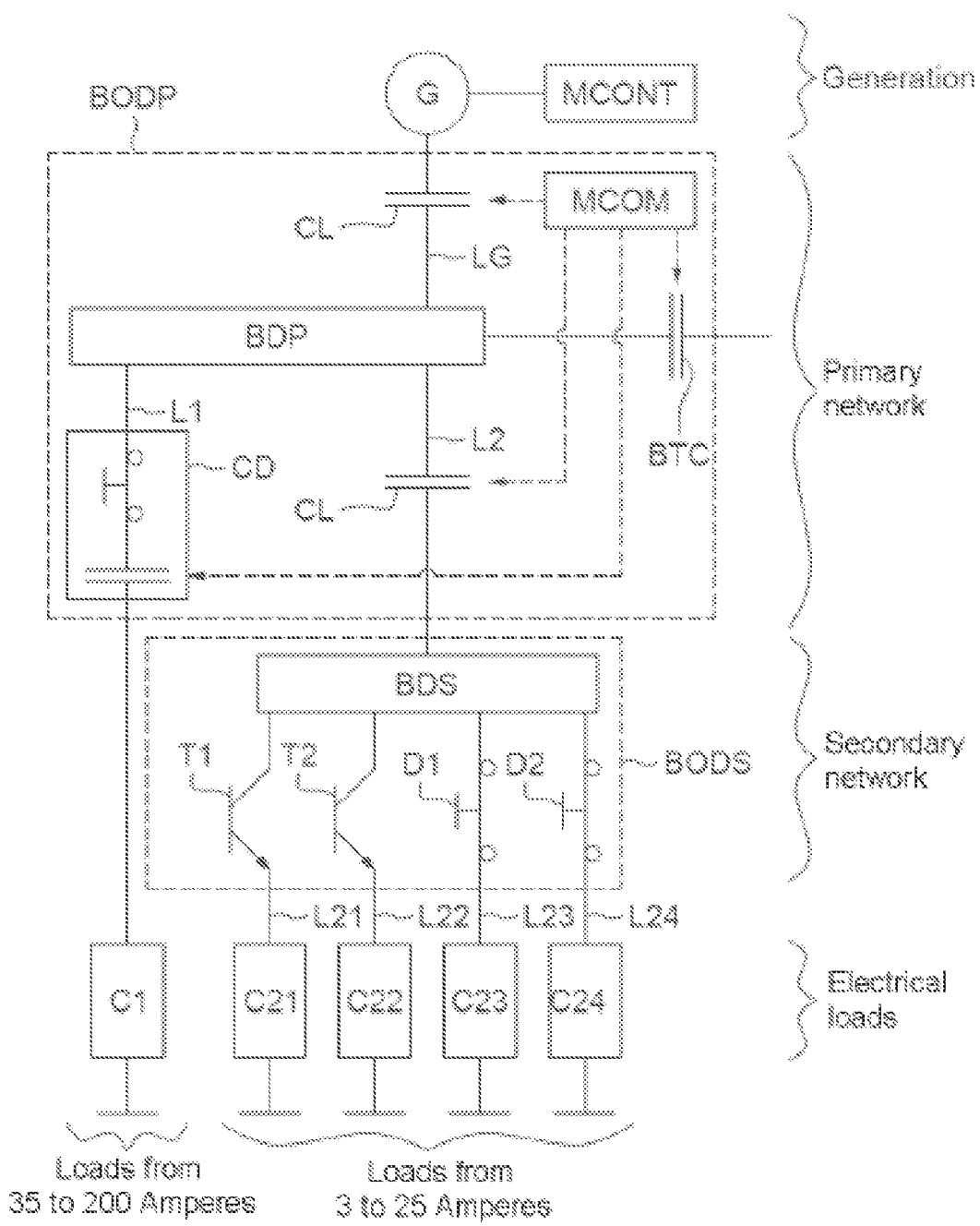
FIG. 1 illustrates in a schematic manner an electrical energy distribution system according to the prior art.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

In FIG. 1 an aircraft electrical energy supply system has been schematically represented. This system essentially comprises a generator G, a primary network, a secondary network and a set of electrical loads C1 to C24. The primary network comprises a primary distribution box BODP intended to provide electrical energy via the onboard network to the loads C1, C21, C22, C23, C24 or to secondary distribution boxes BODS of the secondary network.

As seen in this figure, the primary distribution box BODP is supplied by the dedicated generator G, itself commanded by a command means MCONT. The box BODP comprises a primary distribution bar BDP which ensures the distribution of the current delivered by the generator.

The generator G is linked to the primary bar BDP by means of a cable LG. The primary bar BDP is linked to the downstream part of the distribution network via two cables L1 and L2. The first cable L1 is linked directly to a load C1 of the aircraft while the second cable L2 is linked to a secondary distribution box BODS.

The primary bar BDP is also linked to other primary distribution boxes (not represented) via BTC contactors. These contactors are of the Bus Tie Contactor type according to a term well known to the person skilled in the art. Each of these BTC contactors allows the electrical connection of the bar BDP to a distribution bar of another primary distribution box.

The secondary distribution box BODS comprises a secondary bar BDS. The secondary distribution bar BDS is linked via four cables L21, L22, L23, L24 to four loads C21, C22, C23, C24.

By way of exemplary embodiment, the load C1 consumes from 35 to 200 amperes and the loads C21, C22, C23, C24 each consume from 3 to 25 amperes.

The system for protecting the primary distribution box BODP comprises here two line contactors CL. A first line contactor CL is located on the cable LG, the other line contactor CL being located on the cable L2.

The system for protecting the box BODP also comprises a circuit breaker contactor CD located on the cable L1 between the primary bar BDP and the load C1 of the aircraft.

The circuit breaker contactor CD could be replaced with a circuit breaker, a fuse or a component of another technology ensuring the same function. All these protection elements (circuit breaker contactor, fuse, circuit breaker) allow opening in the case of a current overload. The circuit breaker contactor CD could also be replaced with a simple line contactor CL or a component of another technology ensuring the same function.

The system for protecting the box BODP furthermore comprises control means MCOM. The control means MCOM are configured to open or close each of the contactors CL, CD and BTC, for example if an electrical fault is detected.

The device for protecting the secondary distribution box BODS comprises two transistors T1 and T2 envisaged respectively on cables L21, L22 and two circuit breakers D1 and D2 envisaged respectively on cables L23, L24.

Figure 2:
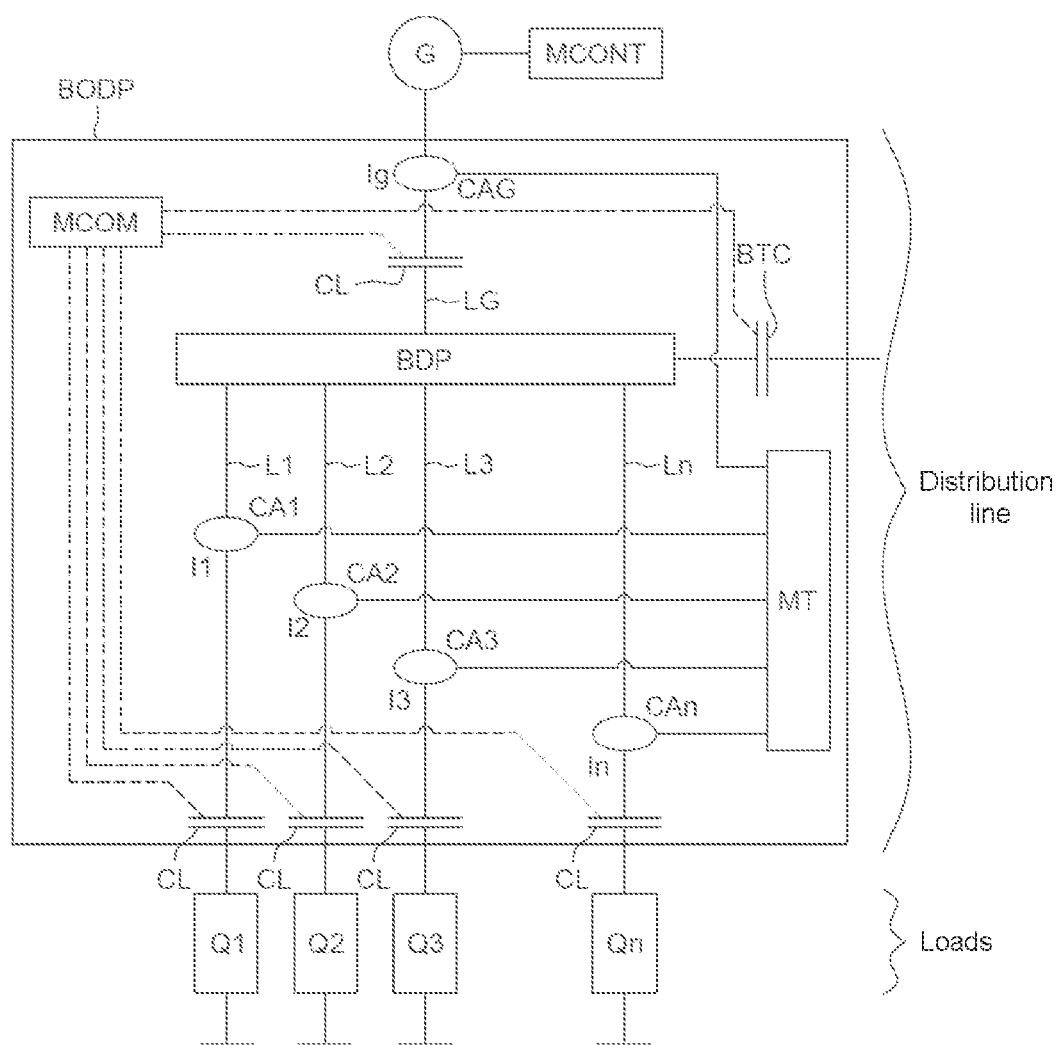
FIG. 2 illustrates in a schematic manner a system for protecting an electrical distribution box according to the invention.

FIG. 2 represents an aircraft electrical energy supply system fitted with a device for protecting the primary distribution box according to the invention. In this figure may be seen the generator G and the loads Q1, Q2, Qn. The system is here fitted with a distribution line comprising a primary distribution box BODP furnished with a protection system according to the invention.

The distribution box BODP of FIG. 2 is supplied by the dedicated generator G which is itself commanded by a command means MCONT, and comprises a primary distribution bar BDP. The bar BDP is linked to another primary distribution box (not represented) via BTC contactors. Each of these BTC contactors allows electrical connection of the bar BDP to a distribution bar of another primary distribution box.

Thus, for each of the other primary distribution boxes, a BTC contactor switches a supply current if the generator G is inoperative and the generator dedicated to the other primary distribution box is available. Conversely, the BTC contactor switches a load current if the generator dedicated to the other primary distribution box is inoperative and the generator G is available.

The primary distribution box of FIG. 2 differs from that of FIG. 1 in that it comprises n cables L1, L2 ... Ln linking the primary distribution bar BDP to loads Q1, ... Qn. The system for protecting the box BODP of FIG. 2 comprises n+1 line contactors CL. A line contactor CL is located on the cable LG and n line contactors CL are located respectively on cables L1 ... Ln. The protection system further comprises control means MCOM. These control means MCOM are configured to open or close each of the contactors CL and BTC, for example if an electrical fault is detected.

Furthermore, the system for protecting the box BODP comprises detection means serving to detect the appearance of an electrical fault in the primary distribution box BODP.

These detection means comprise a means for measuring the current CAG disposed on the cable LG. This means for measuring the current CAG is configured to measure the current Ig passing through the cable LG. By way of exemplary embodiment the means for measuring the current CAG is an ammeter or an intensity transformer.

They moreover comprise current measuring means CA1 ... CAn disposed on each of the cables L1, ... Ln. These means for measuring the current are adapted for measuring the currents I1, I2, ... In passing through each of the cables L1, ... Ln. By way of exemplary embodiment the means for measuring the current are intensity transformers.

The detection means furthermore comprise processing means MT configured to process the measurements of current of the sensors CAG, CA1, ... CAn.

Figure 3:
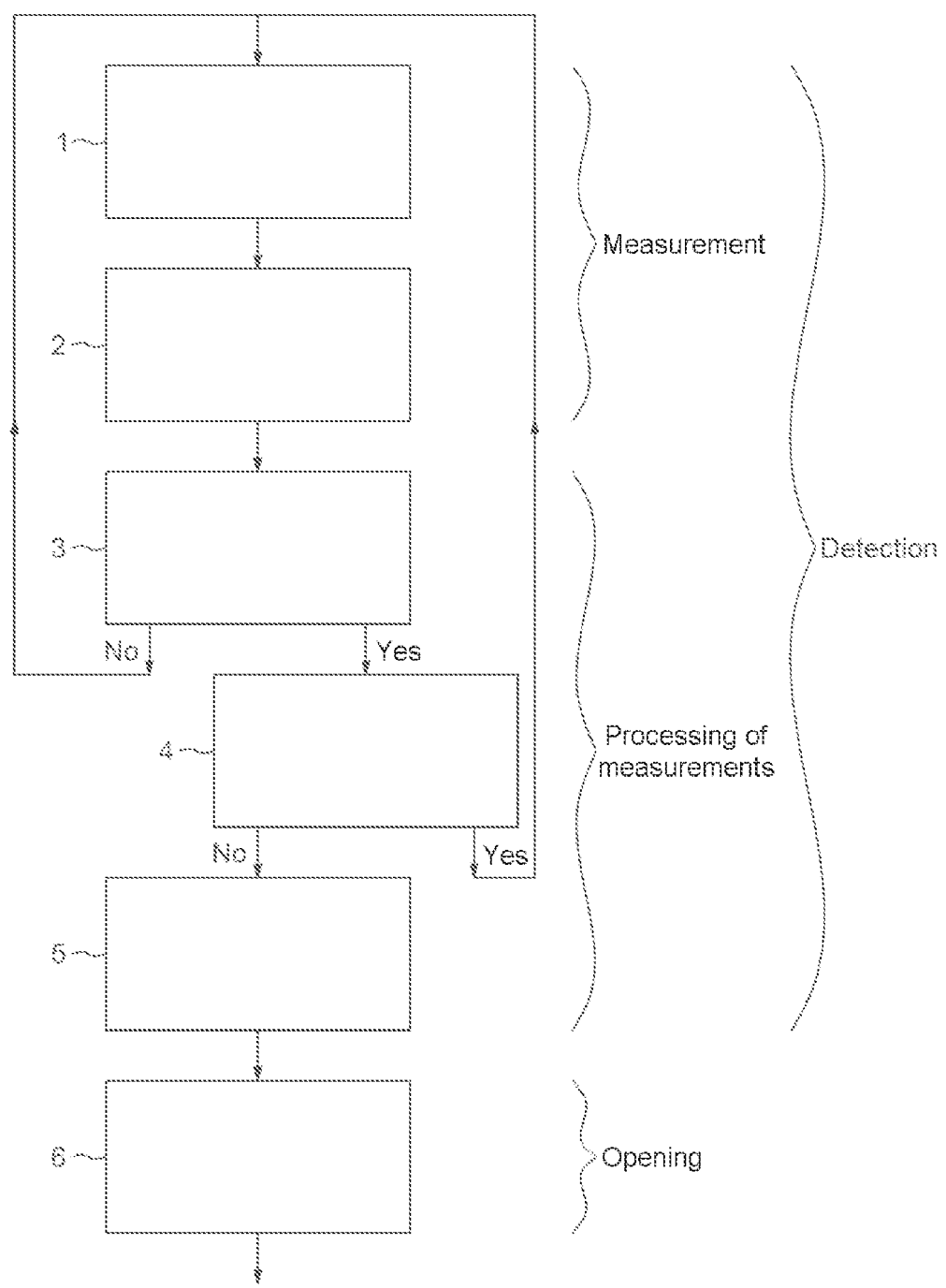
FIG. 3 illustrates in a schematic manner a method for protecting an electrical energy distribution box according to the invention.

The main steps of a method for protecting the distribution box of FIG. 2 will now be described with reference to FIG. 3.

This method essentially comprises a detection of a fault and a main step of opening the contactors.

The detection of a fault comprises a step of measuring currents and a step of processing the measured currents.

The measurement step comprises a first step 1 in the course of which the current Ig flowing upstream of the distribution box is measured and a second step 2 in the course of which the currents I1, I2, ... In flowing at the output of this box are measured.

The step of processing the measured currents comprises a first step 3 in the course of which the supply current Ig measured by the sensor CAG is compared with a supply current threshold value Igs. More precisely, the processing means MT test the expression Ig>Igs. If the value of the measured current is greater than the threshold value, then we go to the next step. In the converse case, we return to the previous measurement step. With an appropriately chosen threshold value (for example 140% of the nominal value Ig), the test Ig>Igs makes it possible to detect an overload of the generator G.

During the next step 4, the load current I1 measured by the sensor CA1 is compared with a first load current threshold value IS1. The load current I2 measured by the sensor CA2 is compared with a second load current threshold value IS2. Finally, the load current In measured by the sensor CAn is compared with an nth load current threshold value ISn.

More precisely the means MT test the expression "I1>IS1 or I2>IS2 or ... In>ISn". If at least one of the load currents is greater than the load current threshold value, then we return to the previous measurement step. In the converse case, we go to the next step 5.

The test of the expression I1>IS1 or I2>IS2 or ... In>ISn makes it possible to detect with appropriately chosen values of threshold load current IS1, IS2, ... ISn (for example 150% of the nominal values I1, I2, ... In) an overload on at least one of the distribution lines at the level of the sensors CA1 ... CAn.

According to another mode of implementation, not represented, the means MT could test the expression "I1≤IS1 and I2≤IS2 and ... In≤ISn". Stated otherwise, this entails verifying that none of the distribution lines comprises any overload. In this case, we then go to the third step. In the converse case we return to the previous measurement step.

During the next step 5, the processing means MT decide on the presence of an electrical fault at the level of the primary distribution box BODP.

Stated otherwise, in the course of the processing step, a test is carried out to check the presence of an overload of the generator and then the presence of an overload on at least one of the distribution lines. If these two conditions are realized then step 5 is not implemented.

This is because it is then considered that the overload of the generator is due to a fault downstream of the distribution box.

The isolation of the distribution box or the closing of the contactor CL between the generator and the primary distribution bar BDP will not make it possible to resolve this electrical fault. It is not necessary to intervene and the tripping of the downstream protection systems is awaited so as to ensure the selectivity of the protection.

Conversely, in the case of presence of an overload of the generator and of absence of overload in at least one of the distribution lines, then step 5 is implemented.

This is because, if the overload of the generator does not lie in the distribution lines, it is considered that the electrical fault at the origin of the overload of the generator is present in the box BODP, for example because of a short circuit of the bar BDP.

Finally, the main opening step comprises a step 6 in the course of which the control means MCOM control the opening of at least one of the contactors CL. This step is implemented if step 5 has been implemented. By way of exemplary embodiment, the processing means MT are configured to inform the control means MCOM of the activation of step 5.

In the course of this step 6, several actions are possible:
  opening of the contactor CL located on the cable LG between the generator G and the bar BDP;
  opening of the contactors CL located on the cables L1, L2 . . . Ln downstream of the bar BDP;
  shutting down of the generator G by using the command means MCONT.

These various actions can be carried out successively, simultaneously, or alternately.

The invention thus makes it possible to isolate the defective box BODP from the generator and/or from the downstream part of the distribution circuit in order to avoid damaging the other items of equipment.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for protecting an electrical energy distribution box (BODP) equipped with a supply current distribution bar (BDP) intended to be connected between an electrical energy source (G) and loads (Q1, Q2, Q3 . . . Qn) to be supplied, comprising detecting an electrical fault in the distribution box (BODP) comprising:
  (1) measuring a supply current drawn on said supply current distribution bar (BDP) by the electrical energy source (G),
  (2) measuring load currents (CA1, CA2, CAn) distributed from the distribution bar to each of the loads (Q1, Q2, Q3 . . . Qn), and
  (3, 4, 5) continuous processing of said measurements of current in the course of which the supply current and the load currents are compared with values of overload current detection threshold so as to detect overloads wherein the processing steps (3, 4, 5) comprise:
    (3) comparing the supply current with a supply current threshold value;
      if the supply current is greater than the supply current threshold value, then (4) comparing the load currents with load current threshold values;
    (5) detecting an electrical fault in the distribution box (BODP) if on completion of the second comparison step (4) none of the load currents is greater than the load current threshold values.

2. The method of claim 1, wherein the distribution box is a primary distribution box (BODP) comprising a first switching component (CL, BTC) located between the electrical energy source (G) and the distribution bar (BDP) and second switching components (CL, BTC) located between the distribution bar and each of the loads (Q1, Q2, Q3 . . . Qn), wherein the method further comprises (6) opening at least one of the switching components (CL, BTC) if a fault is detected in the distribution box (BODP).

3. The method of claim 2, wherein in the course of the opening step (6) the first switching component (CL, BTC) is opened.

4. The method of claim 3, wherein the course of the opening step (6) the second switching components (CL, BTC) are opened.

5. The method of claim 3, wherein the opening step (6) further comprises shutting down the electrical energy source (G).

6. The method of claim 2, wherein in the course of the opening step (6) the second switching components (CL, BTC) are opened.

7. The method of claim 6, wherein the opening step (6) further comprises shutting down the electrical energy source (G).

8. The method of claim 2, wherein the opening step (6) further comprises shutting down the electrical energy source (G).

9. A system for protecting an electrical energy distribution box (BODP) equipped with a supply current distribution bar (BDP) intended to be connected between an electrical energy source (G) and loads (Q1, Q2, Q3 . . . Qn) to be supplied, which comprises detecting detector for an electrical fault in the distribution box (BOPD) the protection system comprising:
  a first measurement device which measures a supply current drawn on said supply current distribution bar (BDP) by the electrical energy source (G);
  second measurement device which measures load currents (CA1, CA2, CAn) distributed from the distribution bar to each of the loads (Q1, Q2, Q3 . . . Qn); and
  a processor which processes said measurements of current, wherein the processor comprises a comparing device that compares the supply current and load currents with threshold values so as to detect overloads;
  wherein the processor comprises:
    first comparison device configured to compare the supply current with a threshold value of a supply current,
    second comparison device configured to compare the load currents with load current threshold values if the supply current is greater than the threshold value of the supply current,
  wherein the processor (MT) is configured to detect an electrical fault in the distribution box (BODP) if none of the load currents is greater than the load current threshold values.

10. The system of claim 9, further comprising:
a first switching component (CL, BTC) located between the electrical energy source (G) and the distribution bar (BDP); and
second switching components (CL, BTC) located between the distribution bar and each of the loads and a controller (MCOM) adapted for opening at least one of said switching components (CL, BTC) if an electrical fault is detected in the distribution box.

11. The system of claim 10, in which the controller (MCOM) is adapted for opening the switching component (CL, BTC) if an electrical fault is detected in the distribution box.

12. The system of claim 11, wherein the electrical energy source (G) is commanded by a command device (MCONT) adapted for commanding shutdown of the electrical energy source (G) if an electrical fault is detected in the distribution box (BODP).

13. The system of claim 10, wherein the electrical energy source (G) is commanded by a command device (MCONT) adapted for commanding shutdown of the electrical energy source (G) if an electrical fault is detected in the distribution box (BODP).

\* \* \* \* \*